(12) United States Patent
Byle et al.

(10) Patent No.: US 11,118,701 B2
(45) Date of Patent: Sep. 14, 2021

(54) FLOW CONTROL MODULE

(71) Applicant: THE COCA-COLA COMPANY, Atlanta, GA (US)

(72) Inventors: Francis R. Byle, Hubertus, WI (US); Christopher J. Kujawski, Waukesha, WI (US); Dominic P. Petri, Grafton, WI (US); Brian B. Johnson, Roswell, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/490,754

(22) PCT Filed: Mar. 2, 2018

(86) PCT No.: PCT/US2018/020673
§ 371 (c)(1),
(2) Date: Sep. 3, 2019

(87) PCT Pub. No.: WO2018/160972
PCT Pub. Date: Sep. 7, 2018

(65) Prior Publication Data
US 2020/0003325 A1    Jan. 2, 2020

Related U.S. Application Data

(60) Provisional application No. 62/466,875, filed on Mar. 3, 2017, provisional application No. 62/506,915, filed on May 16, 2017.

(51) Int. Cl.
*F16K 31/06* (2006.01)
*F16K 27/02* (2006.01)

(52) U.S. Cl.
CPC ........ *F16K 31/0679* (2013.01); *F16K 27/029* (2013.01); *F16K 31/0658* (2013.01)

(58) Field of Classification Search
CPC ..... Y10T 137/87981; Y10T 137/87917; Y10T 137/87925; F16K 1/526; F16K 1/42;
(Continued)

(56) References Cited

U.S. PATENT DOCUMENTS

| 4,206,781 A | 6/1980 | Salter |
| 4,660,770 A * | 4/1987 | Gieseking ............... B05B 12/06 239/585.3 |

(Continued)

FOREIGN PATENT DOCUMENTS

| CN | 204062102 U | 12/2014 |
| CN | 105916418 A | 8/2016 |

(Continued)

OTHER PUBLICATIONS

International Search Report and Written Opinion issued by the International Searching Authority (ISA/KR) in PCT Application No. PCT/US2018/020673 dated Jun. 15, 2018. 16 pages.

(Continued)

*Primary Examiner* — Matthew W Jellett
(74) *Attorney, Agent, or Firm* — Meunier Carlin & Curfman LLC

(57) ABSTRACT

A flow control module is provided. The flow control module includes a housing as well as an on/off solenoid assembly and a proportional solenoid assembly mounted to the housing. A flow body is situated within the housing and is interposed between the on/off solenoid assembly and the proportional solenoid assembly. The flow body provides for flow management of a flow of fluid through the housing.

18 Claims, 14 Drawing Sheets

(58) Field of Classification Search
CPC .......... F16K 1/443; F16K 3/262; F16K 11/24; F16K 31/0679; F16K 31/0658; F16K 31/0668; F16K 27/029; F16K 37/005; B67D 1/0888; B67D 1/1218; B67D 2001/0093
USPC ................ 251/360; 137/613, 614.11, 614.12
See application file for complete search history.

(56) References Cited

U.S. PATENT DOCUMENTS

| | | | | |
|---|---|---|---|---|
| 4,771,808 | A * | 9/1988 | Rodger | ............... F16K 31/0658 137/613 |
| 4,889,148 | A | 12/1989 | Smazik | |
| 5,199,459 | A * | 4/1993 | Mullally | ................... F02K 9/58 137/613 |
| 5,374,029 | A | 12/1994 | Bailey | |
| 6,405,755 | B1 * | 6/2002 | Doehla | ............... F16K 31/0679 137/596.17 |
| 6,520,206 | B2 * | 2/2003 | Hotta | ...................... F16K 1/443 137/613 |
| 7,278,447 | B2 * | 10/2007 | Kumar | ................ F16K 31/0679 137/613 |
| 9,416,888 | B2 * | 8/2016 | Keber | ..................... F23N 1/005 |
| 9,915,353 | B2 * | 3/2018 | Westwater | ................ F16K 1/42 |
| 2004/0011409 | A1 | 1/2004 | Martus et al. | |
| 2004/0144423 | A1 | 7/2004 | Everett et al. | |
| 2016/0297663 | A1 | 10/2016 | Zemko | |

FOREIGN PATENT DOCUMENTS

| | | | | |
|---|---|---|---|---|
| DE | 4206875 | A1 | 9/1933 | |
| EP | 2889553 | A1 | 7/2015 | |
| JP | S6131778 | A * | 2/1986 | ............. F16K 31/06 |
| JP | 07-190237 | A | 7/1995 | |
| JP | 2001209435 | A | 8/2001 | |
| WO | 2007098790 | A1 | 9/2007 | |

OTHER PUBLICATIONS

Integrated Solutions for Customized Flow Control-TLX Technologies. YouTube Video. May 3, 2017. https://www.youtube.com/watch?v=yZ1FlasxHqU.

International Preliminary Report on Patentability issued by the International Bureau of WIPO in PCT Application No. PCT/US2018/020673 dated Sep. 12, 2019. 12 pages.

Extended European Search Report for European Application No. 18760418.6 dated Jan. 14, 2021.

Office Action issued for Chinese Application No. 201880021221.3, dated Apr. 23, 2021.

* cited by examiner

FLOW CONTROL MODULE

CROSS-REFERENCE TO RELATED APPLICATIONS

This application is a national stage application filed under 35 U.S.C. § 371 of PCT/US2018/020673 filed Mar. 2, 2018, which claims the benefit of U.S. Provisional Patent Application Serial Nos. 62/466,875 filed Mar. 3, 2017, and 62/506,915 filed May 16, 2017, the disclosures of which are expressly incorporated herein by reference.

FIELD OF THE INVENTION

This invention generally relates to valves, and more particularly to solenoid actuated valves, and even more particularly to solenoid actuated flow control valves.

BACKGROUND OF THE INVENTION

Solenoid actuated flow control valves are readily recognized as providing accurate flow control. In their most basic form, a solenoid having movable armature is attached to a housing of the valve. The armature moves linearly to open and close a flow path through the valve and/or control the flow characteristics of the flow through the valve. This armature may act directly on a port along the flow path to open and close the port or control flow through the port. Alternatively, the armature may act on another member such as valve member, e.g. a diaphragm, to effectuate flow control.

Examples of such solenoid actuated flow control valves may be readily seen at U.S. Pat. Nos. 8,418,723, 6,056,264, and 5,374,029, disclosures of which are incorporated by reference herein in their entirety. The invention presents a flow control module which presents improvements in the art relative to such flow control valves and a method of controlling such flow control module. These and other advantages of the invention, as well as additional inventive features, will be apparent from the description of the invention provided herein.

BRIEF SUMMARY OF THE INVENTION

In one aspect, a flow control module is provided which utilizes on/off and proportional solenoid flow control and a flow body to achieve desirable flow characteristics. An embodiment of a flow control module according to this aspect includes a housing having an inlet and an outlet and a passageway extending between the inlet and the outlet, the passageway defining a flow path through the flow control module. The flow control module also includes a first solenoid assembly mounted to the housing. The first solenoid assembly is configured as an on/off solenoid assembly such that the first solenoid assembly is operable to allow a flow of fluid along the flow path through the flow control module in an on position and prevent the flow of fluid along the flow path through the flow control module in an off position. The flow control module also includes a second solenoid assembly mounted to the housing. The second solenoid assembly is configured as a proportional solenoid assembly. The second solenoid assembly is configured to proportionally control the flow of fluid along the flow path through the flow control module downstream from the first solenoid assembly relative to the flow path through the flow control module. The flow control module also includes a flow body having a flow passage therethrough. The flow body is situated in the housing along the flow path and interposed between the first solenoid assembly and the second solenoid assembly.

In certain embodiments according to this aspect, the first solenoid assembly includes a first armature. The first armature includes an axially facing seal member. The seal member is arranged to sealingly engage a seal surface of the flow body. The seal surface is defined by a ridge having a semi-circular cross section and extending axially away from a flange of the flow body.

In certain embodiments according to this aspect, the flow passage through the flow body has an inlet region and a transition region, wherein the transition region has a variable cross sectional area. In one embodiment, the transition region has a maximum diameter of 0.200 inches to 0.350 inches.

In certain embodiments according to this aspect, the first solenoid assembly includes a first armature, and wherein the second solenoid assembly includes a second armature. The second armature has an internal cavity which has an axially facing opening that faces the transition region of the flow body. A maximum diameter of the internal cavity is equal to the maximum diameter of the transition region.

In certain embodiments according to this aspect, the flow body is removable relative to the housing.

In certain embodiments according to this aspect, the first solenoid assembly includes a first armature, and wherein the second solenoid assembly includes a second armature and an outer sleeve surrounding the second armature, wherein the second armature includes an annular flow channel formed into an outer surface of the second armature. The annular flow channel is selectively alignable with a plurality of ports formed through the outer sleeve.

In another aspect, a flow control module is provided which utilizes a flow body tailored for smoothly transitioning a flow from an inlet region of the module to an outlet region. An embodiment of a flow control module according to this aspect includes a housing having an inlet and an outlet and a passageway extending between the inlet and the outlet. The passageway defines a flow path through the flow control module. The flow control module also includes a first solenoid assembly mounted to the housing. The first solenoid assembly has a first armature movable relative to the housing. The flow control module also includes a second solenoid assembly is mounted to the housing. The second solenoid has a second armature movable relative to the housing. The flow control module also includes a flow body situated in the housing along the flow path and interposed between the first armature and the second armature. The flow body defines a flow passage through the flow body. The flow passage through the flow body includes an inlet region and a transition region. The transition region has a variable cross section.

In certain embodiments according to this aspect, the flow body is removable from the housing.

In certain embodiments according to this aspect, the transition region has a maximum diameter of 0.200 inches to 0.350 inches.

In certain embodiments according to this aspect, the first solenoid assembly is configured as an on/off solenoid assembly and the second solenoid assembly is configured as a proportional solenoid assembly. The second solenoid assembly is situated downstream from the first solenoid assembly relative to the flow path through the housing.

In certain embodiments according to this aspect, an annular flow channel is formed in an outer surface of the second armature. The annular flow channel is selectively alignable with a plurality of ports formed in an outer sleeve of the second solenoid assembly.

In yet another aspect, a flow control module is provided which advantageously utilizes an annular flow channel and annular flow region arrangement on an outlet side of the valve for optimal output flow characteristics. An embodiment of a flow control module according to this aspect includes a housing having an inlet and an outlet and a passageway extending between the inlet and the outlet. The passageway defines a flow path through the flow control module. The flow control module also includes first solenoid assembly mounted to the housing. The first solenoid assembly has a first armature movable relative to the housing. The flow control module also includes a flow body situated in the flow path and having a flow passage therethrough. The flow control module also includes a second solenoid assembly mounted to the housing, the second solenoid has a second armature movable relative to the housing. The second armature includes an internal cavity and a plurality of ports formed through an outer surface of the second armature in communication with the internal cavity. The second armature includes an annular flow channel formed in the outer surface of the second armature. The second solenoid assembly includes an outer sleeve surrounding the second armature. An annular flow space is defined between an outer surface of the sleeve and an interior surface of the housing. The annular flow channel movable relative to a plurality of ports formed through the sleeve.

In certain embodiments according to this aspect, the flow body is removable.

In certain embodiments according to this aspect, the flow passage through the flow body includes an inlet region and a transition region.

In certain embodiments according to this aspect, the transition region has a maximum diameter of 0.200 inches to 0.350 inches.

In certain embodiments according to this aspect, the first solenoid assembly is configured as an on/off solenoid assembly and the second solenoid assembly is configured as a proportional solenoid assembly. The second solenoid assembly is situated downstream from the first solenoid assembly relative to the flow path through the housing.

In certain embodiments according to this aspect, the second armature has an internal cavity which has an axially facing opening that faces the transition region of the flow body, wherein a maximum diameter of the internal cavity is equal to the maximum diameter of the transition region.

In certain embodiments according to this aspect a method of controlling the flow control module includes a flow meter in-line with the flow such that the flow meter generates a feedback signal to control the first solenoid assembly and the second solenoid assembly. The flow meter may be located between the inlet port and a fixed orifice.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the illustrations, FIGS. 1-5 illustrate an embodiment of a flow control valve (referred to herein as a flow control module) according to the teachings herein. The flow control module is a dual-solenoid assembly arrangement, with each solenoid assembly functionally acting on a flow through the flow control module. One solenoid assembly is configured as an on/off solenoid assembly, which is defined herein as a solenoid assembly which acts to fully open or fully close a flow path through the flow control module by having two discrete positions, one in which flow is permitted along the flow path and one in which flow is not permitted.

The other solenoid assembly is configured as a proportional solenoid assembly, which is defined herein as a solenoid assembly which acts to proportionally control a flow of fluid along the flow path through the flow control module, where there exists a proportional relationship between flow rate and a position of an armature of the proportional solenoid assembly.

As described below, a flow body is positioned along the flow path between the first and second solenoid assemblies. The flow body advantageously allows for a smooth transition for the flow through the flow control module between the inlet and outlet side thereof. As used herein, the inlet side of the flow control module is the region of the flow path upstream from the flow body relative to a flow direction (i.e. the direction moving from the inlet to the outlet along the flow path), and the outlet side of the flow control module is the region of the flow path downstream from the flow body relative to the flow direction. The flow body achieves this smooth transitioning by employing a passageway having a transition region with a variable cross section.

As also described below, the second solenoid assembly is configured to maintain the laminar characteristics of the flow through the flow control module. In particular, the second solenoid assembly includes an armature having an annular flow channel which is selectively alignable with a plurality of ports formed through an outer sleeve surrounding the armature. These ports open to an annular flow region surrounding the exterior of the outer sleeve and bounded by an interior surface of the housing. This annular flow region is in fluid communication with the outlet port of the flow control module. The annular flow channel and annular flow region, with the aid of the above described flow body, maintain desirable laminar flow characteristics through the flow control module.

Figure 1:
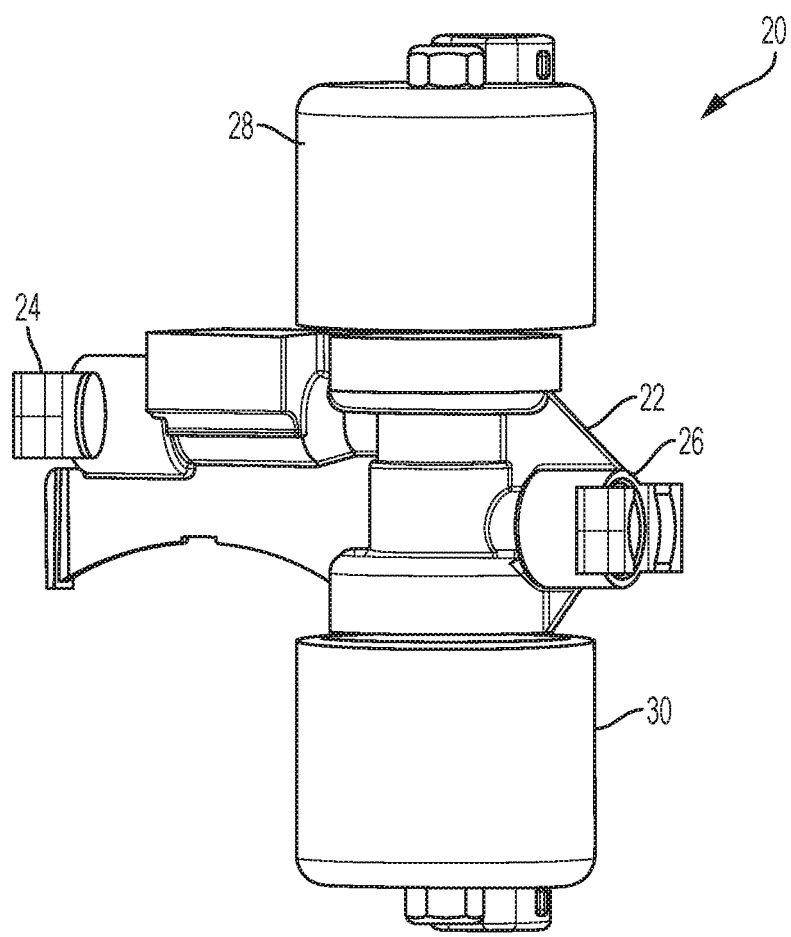
FIG. 1 is a perspective view of an exemplary embodiment of a flow control module according to the teachings herein.

Turning now to FIG. 1, an embodiment of the above introduced flow control module 20 is illustrated. Flow control module 20 includes a housing 22 which has an inlet 24 and an outlet 26. A flow path extends between inlet 24 and outlet 26. A first solenoid assembly 28 is attached to an upper portion of flow control module 20 as illustrated in FIG. 1. A second solenoid assembly 30 is attached to a lower portion of flow control module 20 as illustrated in FIG. 1. As introduced above, first solenoid assembly 28 is an on/off solenoid assembly. Second solenoid assembly 30 is a proportional solenoid assembly. Functionally, first solenoid assembly 28 is responsible for allowing or preventing flow from reaching the outlet side of flow control module 20. Second solenoid assembly 30 is responsible for proportionally controlling the flow to outlet 26 from the outlet side of flow control module 20.

Flow control module 20 is not limited to any particular application. Indeed, it may be utilized for the flow of any fluid with only minor application specific adjustments needed. As used herein, the term "fluid", means any liquid or gas. As one non-limiting example, flow control module 20 is ideally suited for use in controlling the flow of a fluid which must remain generally laminar. Such fluids include but are not limited to carbonated fluids used for beverages or the like, where avoiding turbulence is desired to avoid out gassing.

Figure 2:
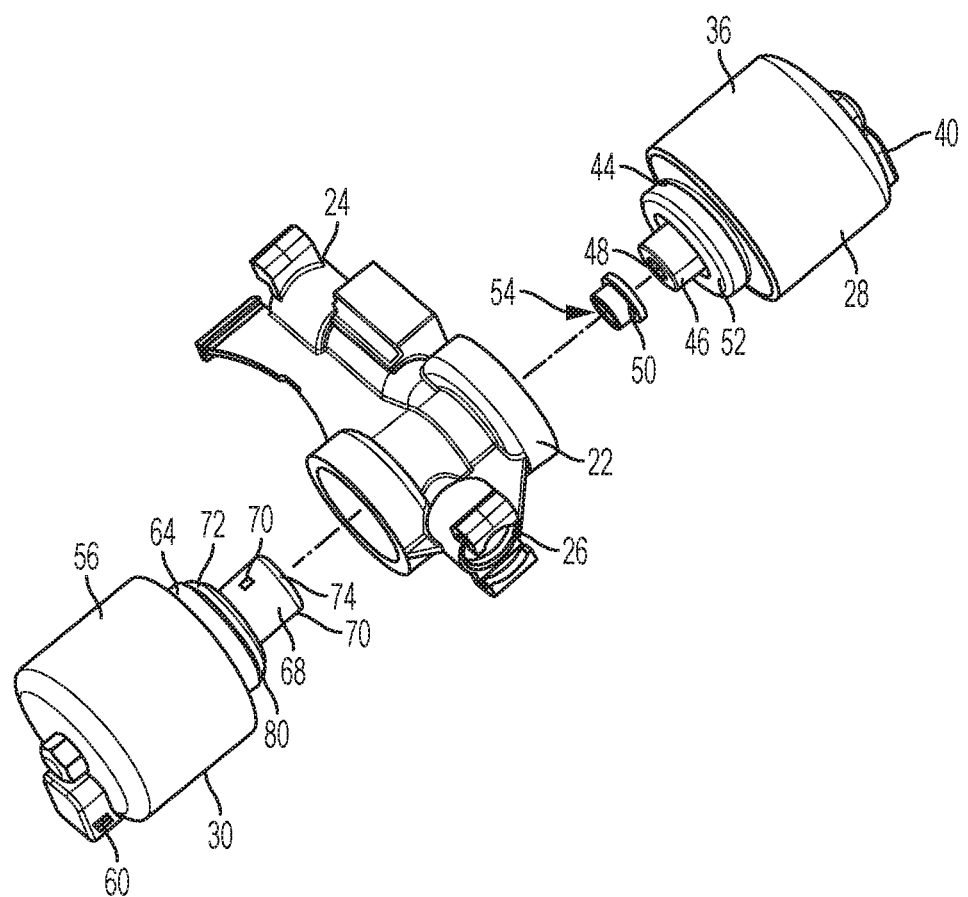
FIG. 2 is an exploded view of the embodiment of FIG. 1.
Figure 3:
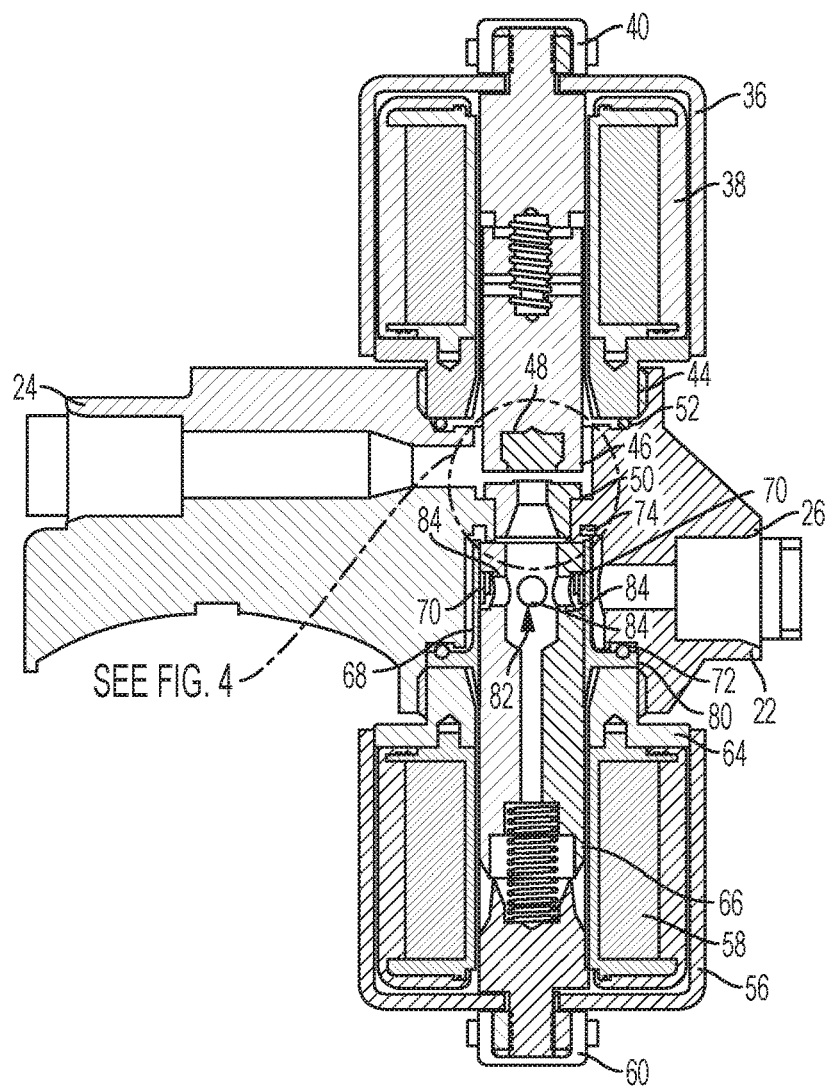
FIG. 3 is a cross section of the embodiment of FIG. 1.

Turning now to FIG. 2, first solenoid assembly 28 includes a housing 36 housing a solenoid winding or coil 38 (see FIG. 3). A connector 40 is used for connecting first solenoid assembly 28 to a controller described below. First solenoid assembly 28 also includes a threaded collar 44 for threadably attaching solenoid assembly 28 to housing 22.

First solenoid assembly 28 also includes a first armature 46 which, when acted upon by coil 38, linearly moves relative to housing 36. First armature 46 carries an axially facing seal member 48 which seals against the above introduced flow body 50, as described in greater detail below. Additionally, a seal 52 is situated at a terminal end of collar 44. This seal 52 is responsible for preventing a leak path at the interface of first solenoid assembly 28 and housing 22. Seal 52 may be formed from any contemporary seal material.

Similarly, second solenoid assembly 30 includes a housing 56 housing a solenoid winding or coil 58 (see FIG. 3). A connector 60 is used for connecting second solenoid assembly 30 to the below described controller. Second solenoid assembly 30 also includes a threaded collar 64 for threadably attaching solenoid assembly 30 to housing 22.

Second solenoid assembly 30 also includes a second armature 66 (see FIG. 3) which, when acted upon by coil 58, linearly moves relative to housing 56. Second armature 66 is surrounded by an outer sleeve 68 which includes a plurality of ports 70, as described in greater detail below. This outer sleeve 68 is fixedly attached to the remainder of second solenoid assembly 30. Second armature 66 is movable within a bore of outer sleeve 68. Sleeve 68 includes a flange 80 which axially abuts a terminal end of collar 64.

Additionally, a seal 72 is situated on flange 80. This seal 72 is responsible for preventing a leak path at the interface of second solenoid assembly 30 and housing 22. Also, an additional seal 74 is provided at an end of outer sleeve 68. Seal 74 is responsible for preventing a leak path around the exterior of flow body 50. Put differently, seal 74 prevents fluid from short circuiting the flow passage 54 through flow body 50. Seals 72, 74 may be formed from any contemporary seal material.

Still referring to FIG. 2, although described above in the context of a threaded connection, first solenoid assembly 28 and second solenoid assembly 30 may be attached to housing 22 via any known mechanical means. For example, first solenoid assembly 28 and second solenoid assembly 30 may be installed onto housing 22 via welding, adhesives, brazing, etc. The particular means of connection is not limiting on the invention herein.

Although not illustrated herein, each of first and second solenoid assemblies 28, 30 are connected to a controller or the like which governs the actuation thereof. This may be a single controller which communicates with both of first and second solenoid assemblies 28, 30, or alternatively, separate controllers which are individually connected to each of first and second solenoid assemblies 28, 30. In either case, electrical current applied to either solenoid assemblies 28, 30 causes their respective armatures to linearly move relative to the remainder of the assembly.

Turning now to FIG. 3, flow control module 20 is shown in cross-section. In the illustrated view, first solenoid assembly 28 is illustrated in its on position, i.e. its discrete position wherein fluid is permitted to flow along the flow path through inlet 24 and enter passageway 54 of flow body 50. This flow of fluid then continues until it reaches an internal cavity 82 formed in armature 66. A plurality of ports 84 are also formed through armature 66 and communicate with internal cavity 82. As a result, fluid is allowed to flow through ports 84 until it encounters outer sleeve 68. Depending upon the position of armature 66, fluid may be permitted to flow through ports 70 formed in outer sleeve 68. Thereafter, this fluid may then exit through outlet 26 as described below.

Figure 4:
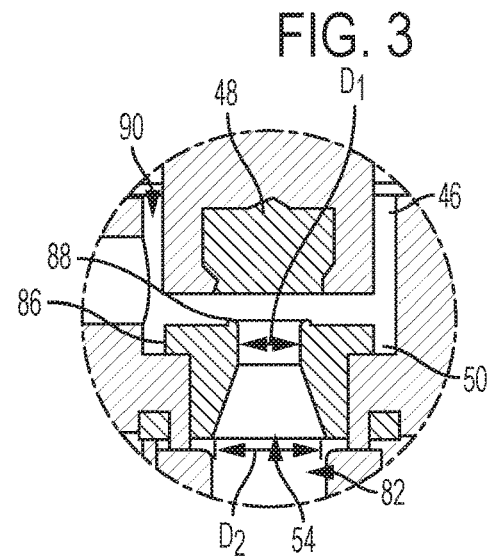
FIG. 4 is partial cross section of the embodiment of FIG. 1, taken in the region of a flow body of the flow control module.

Turning now to FIG. 4, the particulars of flow body 50 will be described in greater detail. As can be seen in this view, flow body 50 includes a flange 86 which seats against an interior surface of housing 22 to locate flow body 50 therein. It should be noted that flow body 50 is illustrated as a separate removable component. This has the advantage of allowing a user to replace flow body 50 with different flow bodies having other flow passage geometries than that shown to accommodate different applications.

As can also be seen in FIG. 4, an annular region 90 surrounds armature 46 and flow body 50. Fluid entering through inlet 24 encounters this annular region and surrounds armature 46 and flow body 50. If first solenoid assembly 28 is in its on position, flow may then proceed into passageway 54. If first solenoid assembly is in its off position, fluid is prevented from entering passageway 54 from annular region 90.

Passageway 54 includes an inlet region having a constant circular cross-sectional area denoted by $D_1$. This inlet region leads to a transition region having a variable circular cross-sectional area as illustrated. The transition region has a maximum diameter $D_2$ which is larger than $D_1$. This allows for a smooth transition from the inlet side to the outlet side of flow control module 20, and more particularly, flow body 50. It should also be noted that the internal cavity 82 has a maximum diameter which is equivalent to the maximum diameter $D_2$ of the transition region of flow body 50. This allows for a gradual increase to the diameter encountered at armature 66 and more particularly that of internal cavity 82, and thus aids in preserving laminar flow characteristics. As non-limiting examples, diameter $D_1$ may be about 0.075 inches to about 0.150 inches, while diameter $D_2$ may increase from that of $D_1$ to a maximum diameter of about 0.200 inches to about 0.350 inches. The term "about" in the preceding is used for allowance of typical manufacturing tolerances for such componentry and materials. The foregoing ranges are exemplary in nature and may be scaled up or down based on sizing and application.

Figure 5:
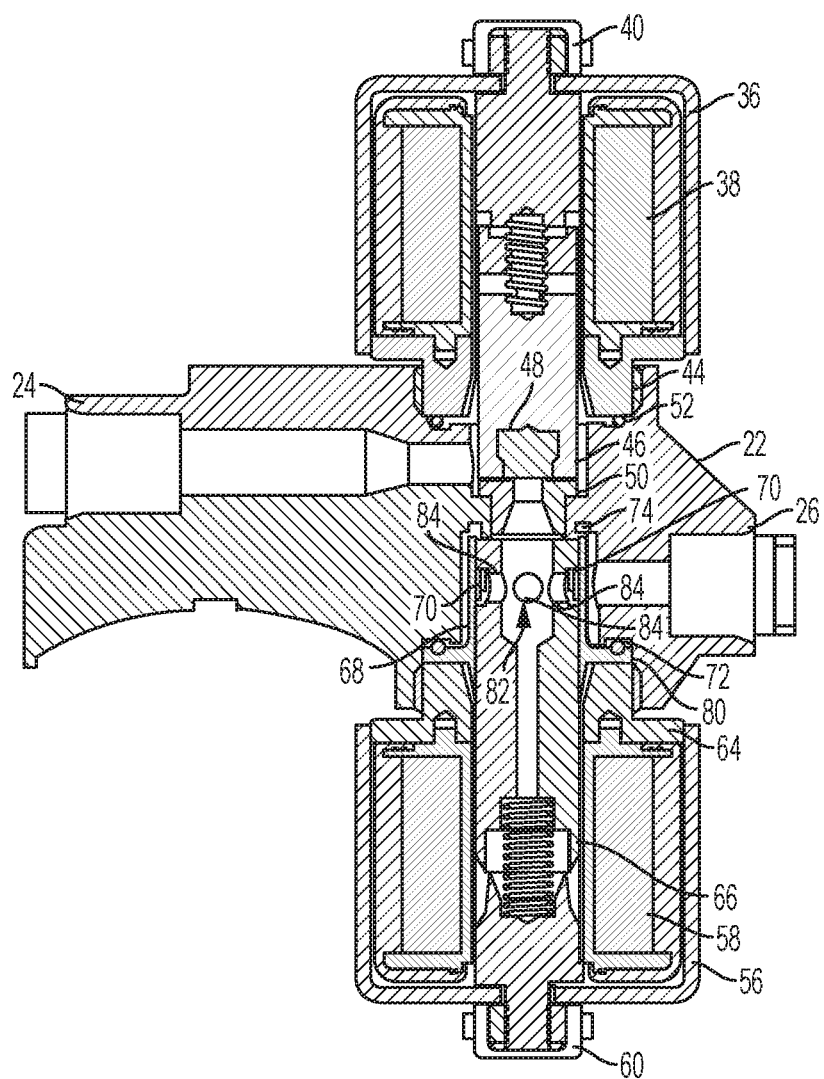
FIG. 5 is another cross section of the embodiment of FIG. 1.

FIG. 5 illustrates first solenoid assembly 28 in its off position, i.e. its discreet position wherein fluid is prevented from flowing along the flow path through flow control module 20 and through flow body 50. This sealed configuration is achieved in part by way of seal 48 which seals against a sealing ridge 88 axially extending from flange 86 as shown in FIG. 4. This sealed configuration is also achieved by way of using a resilient material for the material of flow body 50. As a result, flow body 50 is self-sealing against the interior surface of housing 22 which it contacts. This resilient material may be any contemporary material used for self-sealing capabilities.

Figure 6:
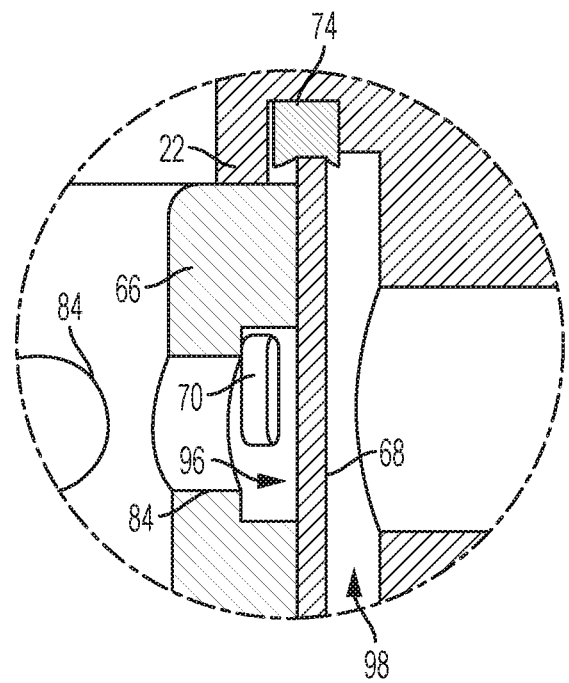
FIGS. 6-7 are partial cross sections of the embodiment of FIG. 1, taken in the region of a second armature of the flow control module.
Figure 7:
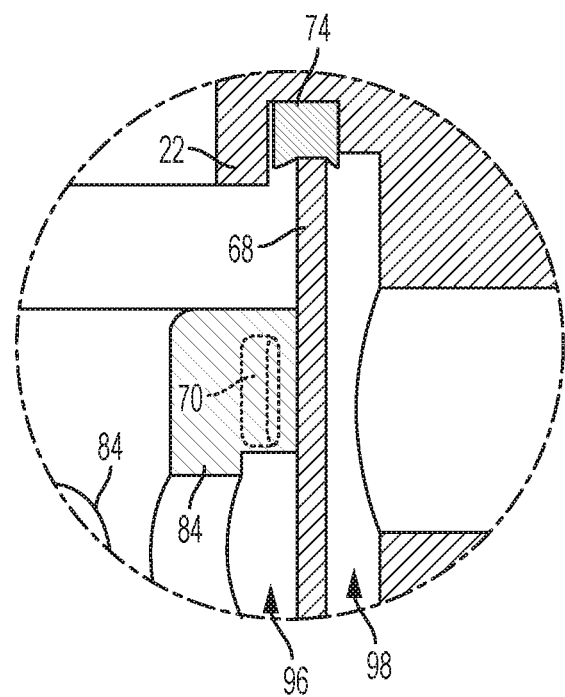

Turning now to FIGS. 6-7, the proportional flow capabilities of second solenoid assembly 30 will be described in greater detail. Each of these views are taken in the region of ports 84 of armature 66. With particular reference to FIG. 6, assuming first solenoid assembly 20 is in its on position, fluid may freely enter internal cavity 82 as described above. Fluid entering this internal cavity 82 then encounters ports 84, also as described above. Ports 84 are in communication with an annular channel 96 formed in an exterior of armature 66. Annular flow channel 96 has a radially inner most surface through which ports 84 extend such that annular flow channel 96 is in fluid communication with internal cavity 82 via ports 84. This radially inner most surface has an outer diameter which is less than the maximum outer diameter of armature 66.

Annular flow channel 66 evenly distributes a fluid flow band around the exterior of armature 66. This annular flow channel 96 is selectively alignable with ports 70. In the particular orientation shown in FIG. 6, annular flow channel 96 completely radially overlaps flow ports 70 of outer sleeve 68. In other words, the maximum possible flow is presented by this configuration. Once the fluid exits flow ports 70 on the exterior side of outer sleeve 68, it encounters an annular flow region 98 as shown. This annular flow region 98 is in fluid communication with outlet 26. The use of the above-described annular flow regions and annular flow channel advantageously promotes the preservation of laminar flow to the extent desired through flow control module 20.

Turning now to FIG. 7, armature 66 has been acted upon by coil 58 such that it has moved downwardly relative to the orientation shown in FIG. 6. In this orientation, fluid is still allowed to flow from flow body 50 to internal cavity 82. This flow is also permitted to flow through ports 84 to encounter annular flow channel 96. However, further fluid flow is prevented given that annular flow channel 96 is no longer aligned with ports 70. In other words, despite first solenoid assembly 28 being in its on position, fluid is still prevented from flowing to outlet 26.

Figure 8:
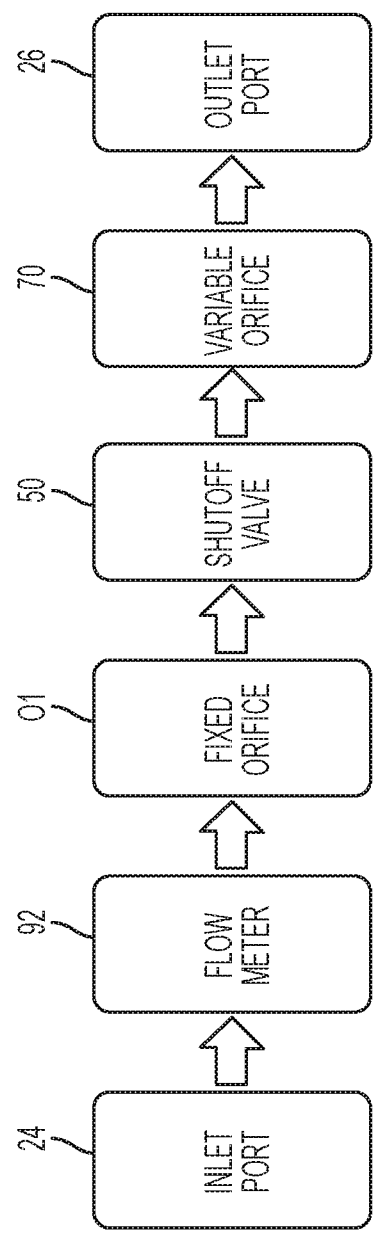
FIG. 8 is a block diagram of the system including a proportional solenoid, inlet and outlet ports, a flow meter, an on-off solenoid and a variable orifice.

FIG. 8 is a block diagram of the flow control module and the associated components for measuring a flow rate. A flow meter 92, such as a turbine flow meter (example part number FT-110 by Gems), is disposed within the orifice between the inlet 24 and the fixed orifice O1 followed by on-off solenoid 50. The variable orifice 70 is further disposed prior to the outlet port 26. Optionally there is a screen at location A to catch debris before entering the first valve. The screen may be for example an S5 mesh.

Figure 9:
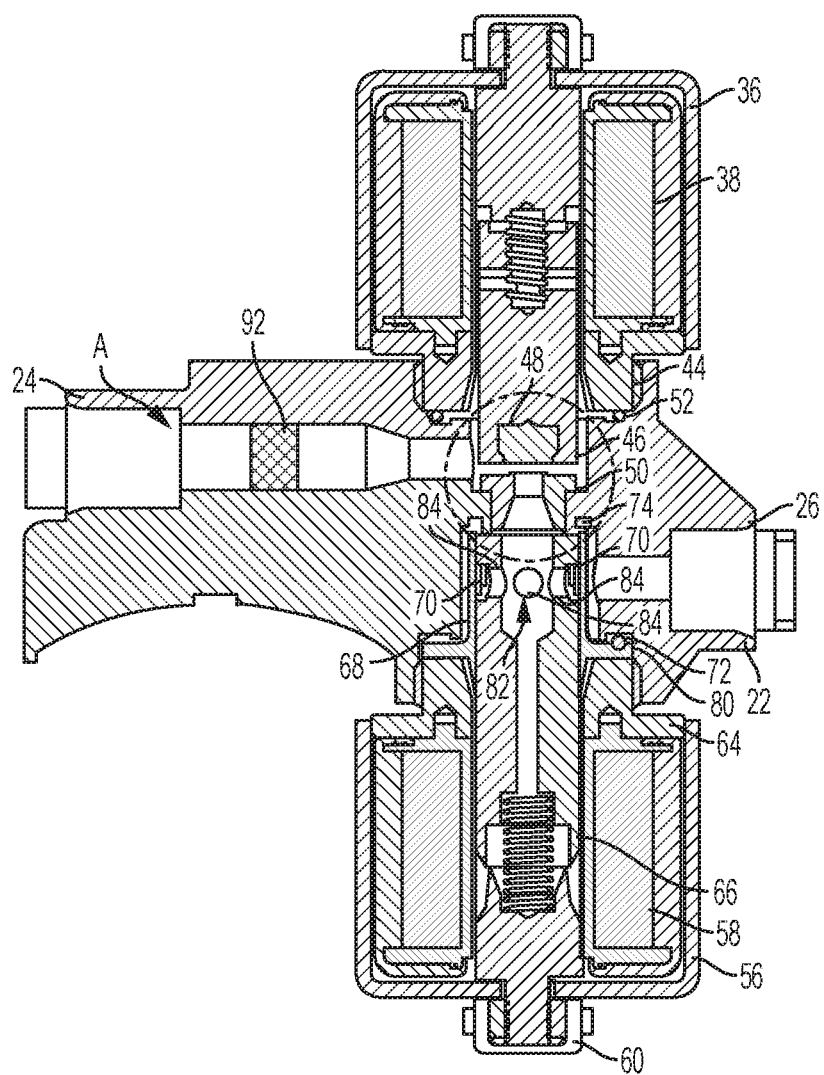
FIG. 9 is a cross section of the embodiment shown in FIG. 1 having a flow meter disposed within the flow path between inlet and the on-off solenoid.

FIG. 9 is a cross-sectional view showing the flow meter 92 within the inlet orifice within the fluid path.

Figure 10:
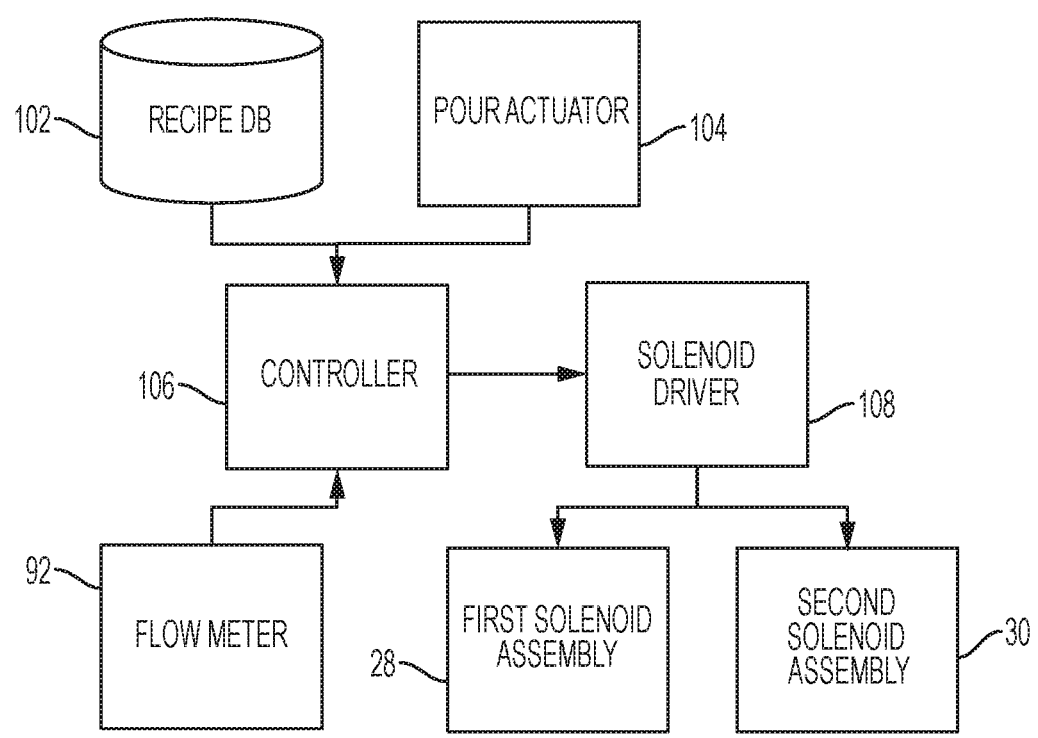
FIG. 10 is a control system block diagram including a controller for controlling the on-off solenoid and the proportional solenoid.

FIG. 10 is a control system block diagram. A recipe database 102 sends required predetermined flow rates to a controller 106. Controller 106 compares the predetermined flow rate with the signal from the flow meter 92, which detects the actual flow rate through the inlet orifice. If the signal received from a pour actuator 104 indicates an "on" status the controller sends a signal to a solenoid driver 108, which in turn sends a signal to the first solenoid assembly 28 such that first solenoid assembly 28 causes the flow control module 20 to flow. Additionally controller 106 sends a signal to the solenoid driver indicating a voltage level to drive the second solenoid assembly 30 so that it releases a flow at the predetermined rate.

Figure 11:
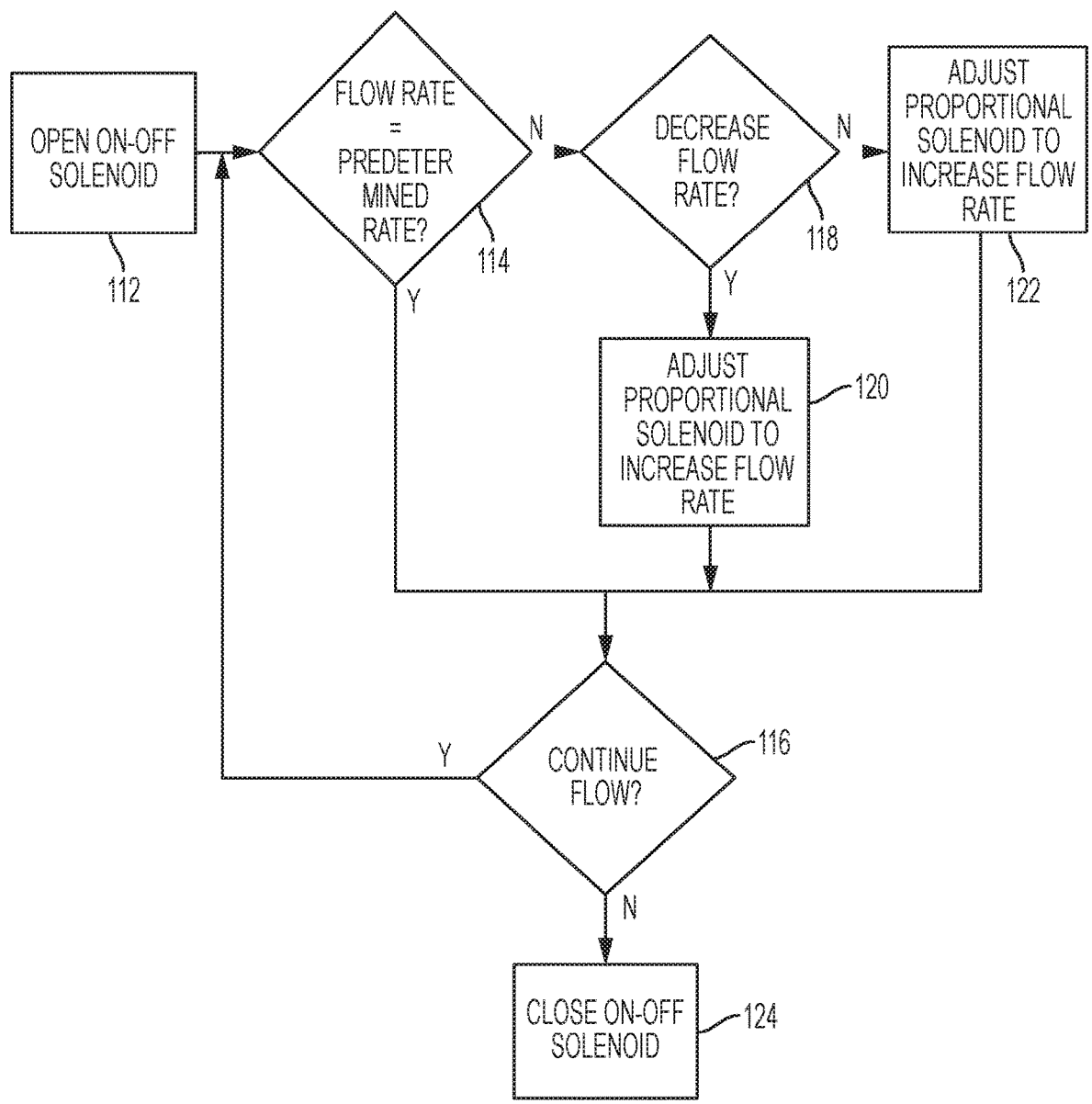
FIG. 11 is a flow diagram of the method of controlling the flow control module.

FIG. 11 is a flow diagram of a method of controlling the flow control module. Step 112 is a command to open the first solenoid assembly 28 as triggered by actuator 104. Proceeding to step 114 the controller 106 compares the predetermined flow rate with that of the actual flow rate as measured by the flow meter 92. If the flow rate is equal to the predetermined flow rate proceed to step 116 if not, proceed to step 118. In step 118 the controller determines whether the actual flow rate is higher than the desired flow rate. If yes the controller 106 sends a signal to solenoid driver 108 to decrease the voltage for the second solenoid assembly 30 and proceed to step 116. If the flow rate is not too low then the controller 106 sends a signal to solenoid driver 108 to increase the second solenoid assembly 30 flow rate then proceed to step 116. In step 116 the controller determines whether the pour actuator 104 is still engaged. If yes return to step 114. If no then send a signal to solenoid driver 108 to close the first solenoid assembly 24.

Figure 12:
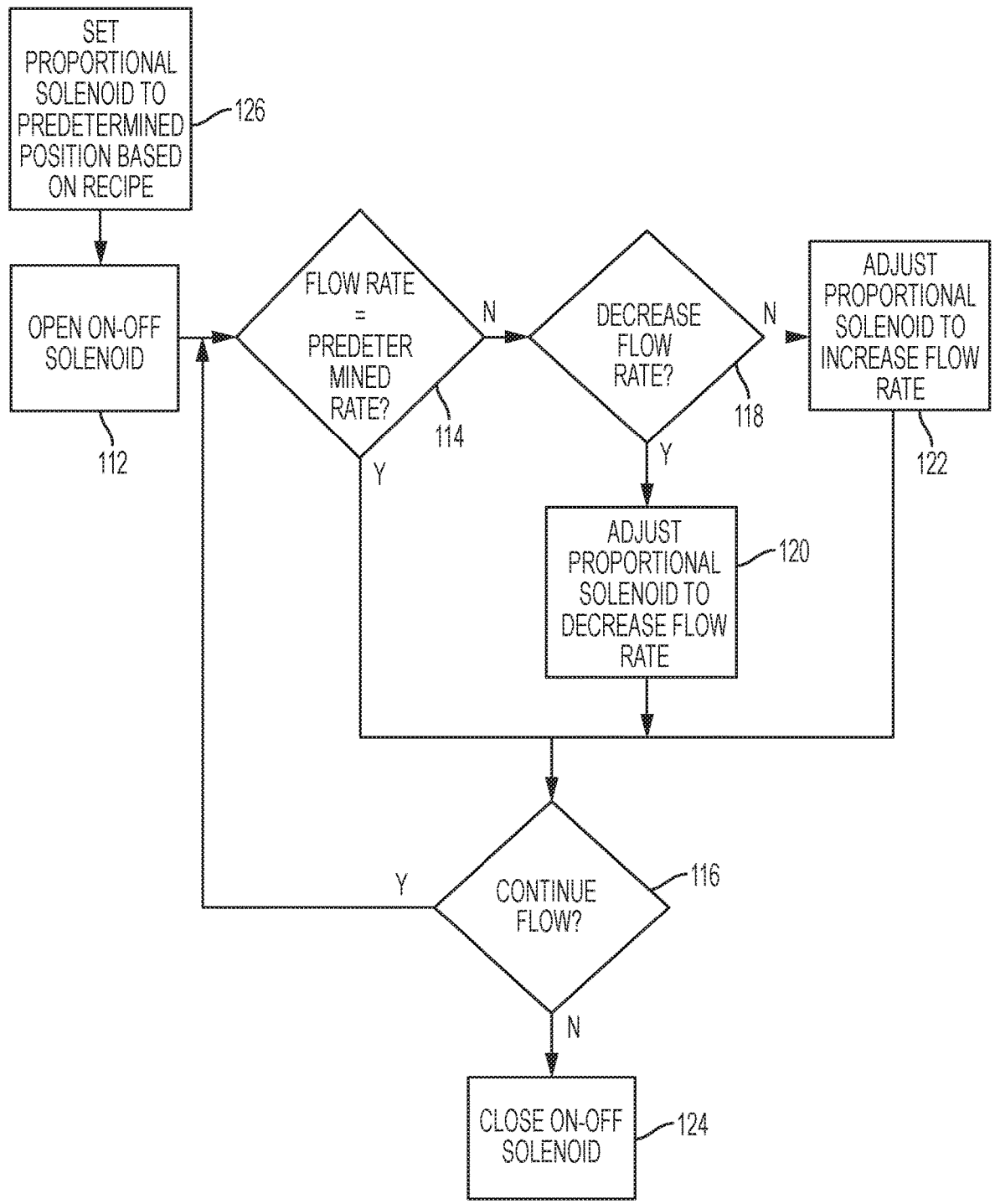
FIG. 12 is an alternative flow diagram of the method of controlling the flow control module.

FIG. 12 is an alternative flow control method wherein a first step 126 includes setting the second solenoid assembly 30 to a predetermined setting according to a selected recipe.

Those of skill in the art will recognize that various modes of operation are capable with the above described configuration. For example, flow may begin by setting first solenoid assembly 28 to the on position. Thereafter, output flow characteristics may be governed by second solenoid assembly 30. As one example, the output flow may begin with a relatively low flow rate by only slightly aligning annular flow channel 96 with ports 70, and then gradually increase by gradually increasing the alignment of flow control channel 96 with ports 70. Thereafter, flow may then be gradually decreased by gradually decreasing the aforementioned alignment. This is only one example of many.

In various embodiments, the flow control module 20 may be used within a beverage dispensing system to regulate the flow of one or more beverage ingredients. For example, a beverage dispensing system (which may include one or more macro-ingredients and one or more micro-ingredients) combines macro-ingredients (such as sweeteners, water, or carbonated water) and micro-ingredients (such as high intensity sweeteners, flavorings, food acids, or additives) to create a finished beverage. Such micro-dosing functionality may increase the dispensing capabilities of the beverage dispensing system to deliver a large variety of beverages and improve the quality of the beverage dispensed by the beverage dispensing system. Generally described, the macro-ingredients may have reconstitution ratios in the range from full strength (no dilution) to about six (6) to one (1) (but generally less than about ten (10) to one (1)). As used herein, the reconstitution ratio refers to the ratio of diluent (e.g., water or carbonated water) to beverage ingredient. Therefore, a macro-ingredient with a 5:1 reconstitution ratio refers to a macro-ingredient that is to be dispensed and mixed with five parts diluent for every part of the macro-ingredient in the finished beverage. Many macro-ingredients may have reconstitution ratios in the range of about 3:1 to 5.5:1, including 4.5:1, 4.75:1, 5:1, 5.25:1, 5.5:1, and 8:1 reconstitution ratios.

The macro-ingredients may include sweeteners such as sugar syrup, HFCS ("High Fructose Corn Syrup"), FIS ("Fully Inverted Sugar"), MIS ("Medium Inverted Sugar"), mid-calorie sweeteners comprised of nutritive and non-nutritive or high intensity sweetener blends, and other such nutritive sweeteners that are difficult to pump and accurately meter at concentrations greater than about 10:1—particularly after having been cooled to standard beverage dispensing temperatures of around 35-45° F. An erythritol sweetener may also be considered a macro-ingredient sweetener when used as the primary sweetener source for a beverage, though typically erythritol will be blended with other sweetener sources and used in solutions with higher reconstitution ratios such that it may be considered a micro-ingredient as described below.

The macro-ingredients may also include traditional BIB ("bag-in-box") flavored syrups (e.g., COCA-COLA bag-in-box syrup) which contain all of a finished beverage's sweetener, flavors, and acids that when dispensed is to be mixed with a diluent source such as plain or carbonated water in ratios of around 3:1 to 6:1 of diluent to the syrup. Other typical macro-ingredients may include concentrated extracts, purees, juice concentrates, dairy products or concentrates, soy concentrates, and rice concentrates.

The macro-ingredient may also include macro-ingredient base products. Such macro-ingredient base products may include the sweetener as well as some common flavorings, acids, and other common components of a plurality of different finished beverages. However, one or more additional beverage ingredients (either micro-ingredients or macro-ingredients as described herein) other than the diluent are to be dispensed and mix with the macro-ingredient base product to produce a particular finished beverage. In other words, the macro-ingredient base product may be dispensed and mixed with a first micro-ingredient non-sweetener flavor component to produce a first finished beverage. The same macro-ingredient base product may be dispensed and mixed with a second micro-ingredient non-sweetener flavor component to produce a second finished beverage.

The macro-ingredients described above may be stored in a conventional bag-in-box container in, at and/or remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. In some instances, the viscosities of the micro-ingredients may be forty (40) centipoise or less. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as pseudoephedrine, acetaminophen; and similar types of ingredients. Various acids may be used in micro-ingredients including food acid concentrates such as phosphoric acid, citric acid, malic acid, or any other such common food acids. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Typically, micro-ingredients for a finished beverage product include separately stored non-sweetener beverage component concentrates that constitute the flavor components of the finished beverage. Non-sweetener beverage component concentrates do not act as a primary sweetener source for the finished beverage and do not contain added sweeteners, though some non-sweetener beverage component concentrates may have sweet tasting flavor components or flavor components that are perceived as sweet in them. These non-sweetener beverage component concentrates may include the food acid concentrate and food acid-degradable (or non-acid) concentrate components of the flavor, such as described in commonly owned U.S. patent application Ser. No. 11/276,553, entitled "Methods and Apparatus for Making Compositions Comprising and Acid and Acid Degradable Component and/or Compositions Comprising a Plurality of Selectable Components," which is herein incorporated by reference in its entirety. As noted above, micro-ingredients may have reconstitution ratios ranging from about ten (10) to one (1) and higher, where the micro-ingredients for the separately stored non-sweetener beverage component concentrates that constitute the flavor components of the finished beverage typically have reconstitution ratios ranging from 50:1, 75:1, 100:1, 150:1, 300:1, or higher.

For example, the non-sweetener flavor components of a cola finished beverage may be provided from separately stored first non-sweetener beverage component concentrate and a second non-sweetener beverage component concentrate. The first non-sweetener beverage component concentrate may comprise the food acid concentrate components of the cola finished beverage, such as phosphoric acid. The second non-sweetener beverage component concentrate may comprise the food acid-degradable concentrate components of the cola finished beverage, such as flavor oils that would react with and impact the taste and shelf life of a non-sweetener beverage component concentrate were they to be stored with the phosphoric acid or other food acid concentrate components separately stored in the first non-sweetener component concentrate. While the second non-sweetener beverage component concentrate does not include the food acid concentrate components of the first non-sweetener beverage component concentrate (e.g., phosphoric acid), the second non-sweetener beverage component concentrate may still be a high-acid beverage component solution (e.g., pH less than 4.6).

A finished beverage may have a plurality of non-sweetener concentrate components of the flavor other than the acid concentrate component of the finished beverage. For example, the non-sweetener flavor components of a cherry cola finished beverage may be provided from the separately stored non-sweetener beverage component concentrates described in the above example as well as a cherry non-sweetener component concentrate. The cherry non-sweetener component concentrate may be dispensed in an amount consistent with a recipe for the cherry cola finished beverage. Such a recipe may have more, less, or the same amount of the cherry non-sweetener component concentrate than other recipes for other finished beverages that include the cherry non-sweetener component concentrate. For example, the amount of cherry specified in the recipe for a cherry cola finished beverage may be more than the amount of cherry specified in the recipe for a cherry lemon-lime finished beverage to provide an optimal taste profile for each of the finished beverage versions. Such recipe-based flavor versions of finished beverages are to be contrasted with the addition of flavor additives or flavor shots as described below.

Other typical micro-ingredients for a finished beverage product may include micro-ingredient sweeteners. Micro-ingredient sweeteners may include high intensity sweeteners such as aspartame, Ace-K, steviol glycosides (e.g., Reb A, Reb M), sucralose, saccharin, or combinations thereof. Micro-ingredient sweeteners may also include erythritol when dispensed in combination with one or more other sweetener sources or when using blends of erythritol and one or more high intensity sweeteners as a single sweetener source.

Other typical micro-ingredients for supplementing a finished beverage product may include micro-ingredient flavor additives. Micro-ingredient flavor additives may include additional flavor options that can be added to a base beverage flavor. The micro-ingredient flavor additives may be non-sweetener beverage component concentrates. For example, a base beverage may be a cola flavored beverage, whereas cherry, lime, lemon, orange, and the like may be added to the cola beverage as flavor additives, sometimes referred to as flavor shots. In contrast to recipe-based flavor versions of finished beverages, the amount of micro-ingredient flavor additive added to supplement a finished beverage may be consistent among different finished beverages. For example, the amount of cherry non-sweetener component concentrate included as a flavor additive or flavor shot in a cola finished beverage may be the same as the amount of cherry non-sweetener component concentrate included as a flavor additive or flavor shot in a lemon-lime finished beverage. Additionally, whereas a recipe-based flavor version of a finished beverage is selectable via a single finished beverage selection icon or button (e.g., cherry cola icon/button), a flavor additive or flavor shot is a supplemental selection in addition to the finished beverage selection icon or button (e.g., cola icon/button selection followed by a cherry icon/button selection).

As is generally understood, such beverage selections may be made through a touchscreen user interface or other typical beverage user interface selection mechanism (e.g., buttons) on a beverage dispenser. The selected beverage, including any selected flavor additives, may then be dispensed upon the beverage dispenser receiving a further dispense command through a separate dispense button on the touchscreen user interface or through interaction with a separate pour mechanism such as a pour button (electromechanical, capacitive touch, or otherwise) or pour lever.

In the traditional BIB flavored syrup delivery of a finished beverage, a macro-ingredient flavored syrup that contains all of a finished beverage's sweetener, flavors, and acids is mixed with a diluent source such as plain or carbonated water in ratios of around 3:1 to 6:1 of diluent to the syrup. In contrast, for a micro-ingredient delivery of a finished beverage, the sweetener(s) and the non-sweetener beverage component concentrates of the finished beverage are all separately stored and mixed together about a nozzle when the finished beverage is dispensed. Example nozzles suitable for dispensing of such micro-ingredients include those described in commonly owned U.S. provisional patent application Ser. No. 62/433,886, entitled "Dispensing Nozzle Assembly," PCT patent application Ser. No. PCT/US15/026657, entitled "Common Dispensing Nozzle Assembly," U.S. Pat. No. 7,866,509, entitled "Dispensing Nozzle Assembly," or U.S. Pat. No. 7,578,415, entitled "Dispensing Nozzle Assembly," which are all herein incorporated by reference in their entirety.

In operation, the beverage dispenser may dispense finished beverages from any one or more of the macro-ingredient or micro-ingredient sources described above. For example, similar to the traditional BIB flavored syrup delivery of a finished beverage, a macro-ingredient flavored syrup may be dispensed with a diluent source such as plain or carbonated water to produce a finished beverage. Additionally, the traditional BIB flavored syrup may be dispensed with the diluent and one or more micro-ingredient flavor additives to increase the variety of beverages offered by the beverage dispenser.

Micro-ingredient-based finished beverages may be dispensed by separately dispensing each of the two or more non-sweetener beverage component concentrates of the finished beverage along with a sweetener and diluent. The sweetener may be a macro-ingredient sweetener and/or a micro-ingredient sweetener and the diluent may be water and/or carbonated water. For example, a micro-ingredient-based cola finished beverage may be dispensed by separately dispensing food acid concentrate components of the cola finished beverage, such as phosphoric acid, food acid-degradable concentrate components of the cola finished beverage, such as flavor oils, macro-ingredient sweetener, such as HFCS, and carbonated water. In another example, a micro-ingredient-based diet-cola finished beverage may be dispensed by separately dispensing food acid concentrate components of the diet-cola finished beverage, food acid-degradable concentrate components of the diet-cola finished beverage, micro-ingredient sweetener, such as aspartame or an aspartame blend, and carbonated water. As a further example, a mid-calorie micro-ingredient-based cola finished beverage may be dispensed by separately dispensing food acid concentrate components of the mid-calorie cola finished beverage, food acid-degradable concentrate components of the mid-calorie cola finished beverage, a reduced amount of a macro-ingredient sweetener, a reduced amount of a micro-ingredient sweetener, and carbonated water. By reduced amount of macro-ingredient and micro-ingredient sweeteners, it is meant to be in comparison with the amount of macro-ingredient or micro-ingredient sweetener used in the cola finished beverage and diet-cola finished beverage. As a final example, a supplemental flavored micro-ingredient-based beverage, such as a cherry cola beverage or a cola beverage with an orange flavor shot, may be dispensed by separately dispensing a food acid concentrate components of the flavored cola finished beverage, food acid-degradable concentrate components of the flavored cola finished beverage, one or more non-sweetener micro-ingredient flavor additives (dispensed as either as a recipe-based flavor version of a finished beverage or a flavor shot), a sweetener (macro-ingredient sweetener, micro-ingredient sweetener, or combinations thereof), and carbonated water. While the above examples are provided for carbonated beverages, they apply to still beverages as well by substituting carbonated water with plain water.

The various ingredients may be dispensed by the beverage dispenser in a continuous pour mode where the appropriate ingredients in the appropriate proportions (e.g., in a predetermined ratio) for a given flow rate of the beverage being dispensed. In other words, as opposed to a conventional batch operation where a predetermined amount of ingredients are combined, the beverage dispenser provides for continuous mixing and flows in the correct ratio of ingredients for a pour of any volume. This continuous mix and flow method can also be applied to the dispensing of a particular size beverage selected by the selection of a beverage size button by setting a predetermined dispensing time for each size of beverage.

Figure 13:
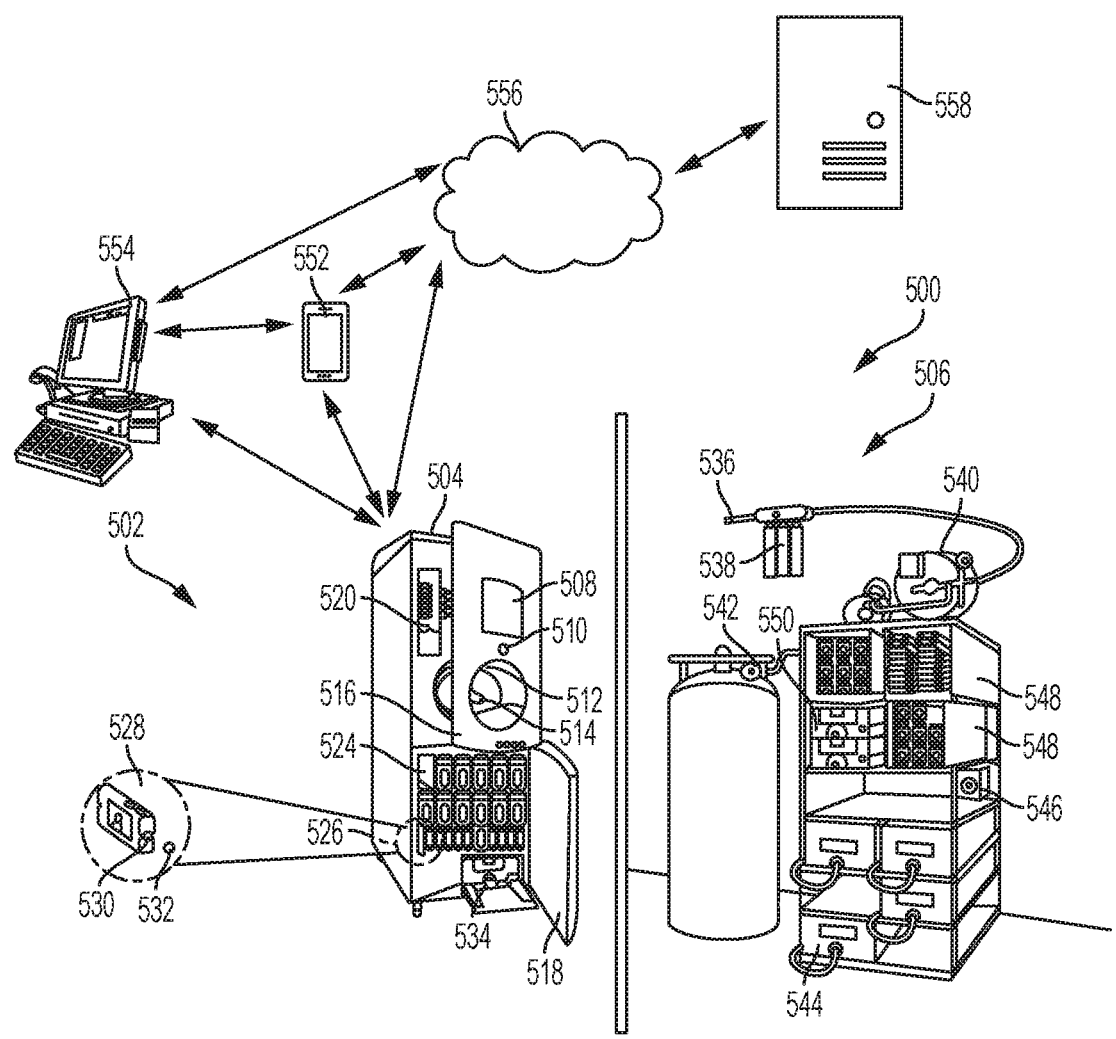
FIG. 13 is an exemplary beverage dispenser system according to the teachings herein.

FIG. 13 illustrates an exemplary beverage dispenser system 500 suitable for implementing the several embodiments of the disclosure. As shown, the beverage dispenser system 500 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 500 includes a front room system 502 with a beverage dispenser 504 and a back room system 506. The beverage dispenser 504 includes a user interface 508, such as a touchscreen display, to facilitate selection of the beverage to be dispensed. The user interface 508 may employ various screens to facilitate user interactions on the beverage dispenser 504 and/or receive a user profile through interaction with a user's mobile device 552, such as described in commonly owned U.S. patent application Ser. No. 14/485,826, entitled "Product Categorization User Interface for a Dispensing Device," which is herein incorporated by reference in its entirety.

Upon receiving a beverage selection via the user interface 508, a pour button 510 may be activated to dispense the selected beverage from the beverage dispenser 504 via a nozzle 514. For example, the pour button 510 may be an electromechanical button, capacitive touch button, or other button selectable by a user to activate the beverage dispenser 504 to dispense a beverage. While shown as a button, the pour button 510 may alternatively be implemented as a lever or other mechanism for activating the beverage dispenser 504 to dispense a beverage. As shown in FIG. 13, the pour button 510 is separate from the user interface 508. In some implementations, the pour button 510 may be implemented as a selectable icon in the user interface 508.

In some implementations, the beverage dispenser may also include an ice lever 514. Upon being activated, the ice lever 514 may cause the beverage dispenser 504 to dispense ice through an ice chute (not shown). For beverage dispensers that do not have an ice bin, such as counter-electric or remote recirculation beverage dispensers, the ice lever 514 may be omitted.

The beverage dispenser 504 may be secured via a primary door 516 and an ingredient door 518. The primary door 516 and the ingredient door 518 may be secured via one or more locks. In some implementations, the locks are a lock and key. In some implementations, the lock on the ingredient door 518 may be opened via an RFID reader (not shown) reading an authorize ingredient package 528. The primary door 516 may secure electronic components of the beverage dispenser 504 including one or more controllers 520. The ingredient door 518 may secure an ingredient compartment that houses an ingredient matrix 524.

The ingredient matrix 524 includes a plurality of slots 526 for receiving ingredient packages 528. In various implementations, the ingredient packages 528 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 13, there are three drawers of ingredients in the ingredient matrix 524. One or more of the drawers may slide back and forth along a rail so as to periodically agitate the ingredients housed on the drawer. Other configurations of the ingredient matrix 524 are possible, such as via one or more static and/or agitated ingredient towers.

Each ingredient package 528 may comprise an RFID tag, a fitment 530, and a fitment seal 532. The fitment seal 532 may be removed prior to installation into the beverage dispenser 504. Upon installation, the fitment 530 may engage with and provide a fluidic communication between a probe (not shown) in the slot 526 and the ingredients contained in the ingredient package 528. The ingredient matrix 524 may also contain one or more large volume micro-ingredient packages 534, such as for one or more micro-ingredient sweetener sources.

The beverage dispenser 504 may also include a carbonator (not shown) for receiving water and carbon dioxide to produce carbonated water. The beverage dispenser 504 may also include one or more heat exchangers (not shown), such as a cold plate, for cooling one or more of the beverage ingredients contained in or received by the beverage dispenser 504. In some implementations, one or more of the micro-ingredients dispensed via the nozzle 512 are not cooled via the heat exchanger or are otherwise maintained at an ambient temperature. Macro-ingredients dispensed via the nozzle 512 are typically cooled via the heat exchanger prior to being dispensed.

The back room system 506 is typically located in a back room remote from the front room system 502, such as a storage area in a merchant location. The back room system 506 includes a water source 536 such as a municipal water supply that provides a pressurized source of plain water. The water received via the water source 536 may be filtered or otherwise treated by a water treatment system 538. The treated water may optionally be pressurized to a desired pressure with a water booster 540 and supplied to the beverage dispenser. A carbon dioxide source 542 may supply carbon dioxide to the beverage dispenser 504.

One or more macro-ingredient sources 544 may be located in the back room. The macro-ingredient from each macro-ingredient source 544 may be supplied to the beverage dispenser 504 via a pump 546. The pump 546 may be a controlled gear pump, diaphragm pump, BIB pump, or any other suitable pump for supplying macro-ingredients to the beverage dispenser 504. The back room system 506 may also include a rack with one or more storage locations 548 for spare micro-ingredients and one or more storage locations 550 for spare macro-ingredients.

The beverage dispenser 504 may include one or more network interfaces for communicating directly with devices in the front room or the back room, communicating with devices in the front room or the back room in a local area network (LAN), or communicating with devices remote from a location with the beverage dispenser system 500 via a wide area network (WAN) connection. For example, the beverage dispenser 504 may include networking devices such as a near field communication (NFC) module, a BLUETOOTH module, a WiFi module, a cellular modem, an Ethernet module, and the like. The beverage dispenser 504 may communicate via a direct communication or via a LAN with a user's mobile device 552 or a point-of-sale (POS) device 554 to receive a beverage selection or user profile of a user for configuring the beverage dispenser 504 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 504 may also communicate via a WAN 556 for communicating with one or more remote servers 558 to receive software updates, content updates, user profiles, or beverage selections made via the remote server 558.

Figure 14:
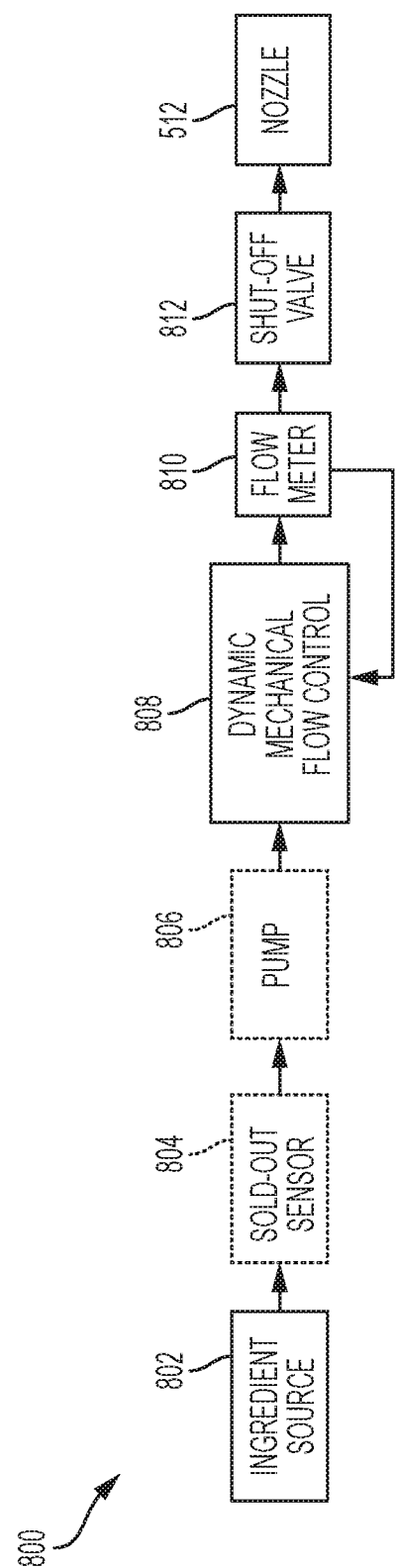
FIG. 14 is an exemplary fluidic circuit with the flow control module according to the teachings herein.

FIG. 14 illustrates an exemplary fluidic circuit 800 with pumping or metering devices from ingredient source 802 to the nozzle 512 of the beverage dispenser 504. The beverage dispenser 504 may include none, one, or a plurality of the fluidic circuits shown in FIG. 14. For each ingredient source, the beverage dispenser 504 may include the fluidic circuit shown in FIG. 14. For example, the fluidic circuit for one or more of the macro-ingredient sources may include the fluidic circuit shown in FIG. 14. In some implementations, the fluidic circuit for the carbonated water and/or the still water source may include the fluidic circuit shown in FIG. 14.

FIG. 14 illustrates an exemplary fluidic circuit 800 with a dynamic mechanical flow control 808, a flow meter 810, and a shut-off valve 812 suitable for implementing the several embodiments of the disclosure. The dynamic mechanical flow control 808 receives a pressurized beverage ingredient from an ingredient source 802 and provides an adjustable flow rate of the beverage ingredient to the nozzle 512. The dynamic mechanical flow control 808 may include a variable sized orifice that adjusts to dynamically change the flow rate of the beverage ingredient supplied to the nozzle 512 based on control signals provided by the one or more controllers 520. A flow meter 810 downstream of the dynamic mechanical flow control 808 measures a flow rate of the beverage ingredient being supplied by the dynamic mechanical flow control 808 and provides a feedback loop to the dynamic mechanical flow control 808 for controlling the variable sized orifice. A shut-off valve 812 downstream of the dynamic mechanical flow control 808 may be actuated to open and close in order to dispense or prevent dispensing the beverage ingredient from the nozzle 512. In various implementations, the dynamic flow control module 808, the flow meter 810, and the shut-off valve 812 may be substituted for the flow control module 20 as described herein. As discussed above, the flow control module 20 has a different order of components that shown for the dynamic flow control module 808, the flow meter 810, and the shut-off valve 812 in FIG. 14.

The ingredient source 802 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The ingredient source 802 may also be the municipal water supply 536 or other pressurized ingredient source. When the ingredient source 802 is not pressurized, the fluidic circuit 800 may include a pump 806 for pressurizing the beverage ingredient from the ingredient source 802. The pump 806 may be any pump suitable for pressurizing the beverage ingredient from the ingredient source 802, such as a BIB pump, CO2 driven pump, controlled gear pump, or positive displacement pump. The fluidic circuit 800 may also optionally include a sold-out sensor 804 for detecting when the ingredient source 802 is empty.

While the components of the fluidic circuit 800 are shown in a particular order in, any order of the components described above may be used. Other variations are readily recognizable by those of ordinary skill in the art. Additionally, one or more heat exchangers (not shown) may be used at any location in the fluidic circuit 800. The heat exchanger may include an ice bin, water bath, cold plate, or remote recirculation system.

Figure 15:
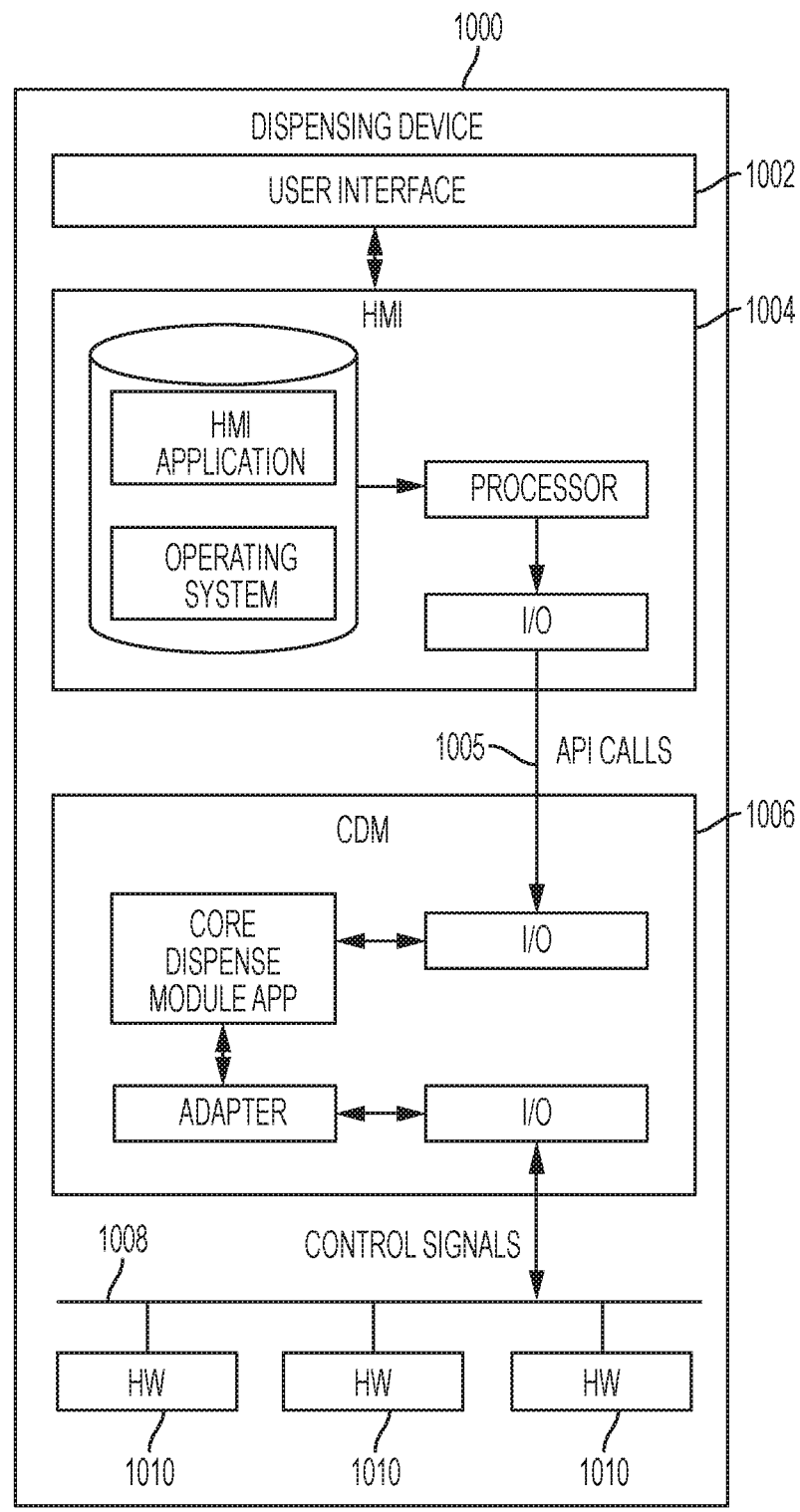
FIG. 15 is an exemplary block diagram of a control architecture for a beverage dispenser according to the teachings herein.

FIG. 15 illustrates an exemplary block diagram of a control architecture 1000 that may be used to control the beverage dispenser 504 suitable for implementing the several embodiments of the disclosure. As shown in FIG. 15, control architecture 1000 may comprise a core dispense module (CDM) 1006, a human machine interface (HMI) module 1004, a user interface (UI) 1002, and a machine bus (MBUS) 1005. HMI 1004 may connect to or otherwise interface and communicate with at least one external device (e.g., mobile device 552 or POS 554) being external to beverage dispenser 504. HMI 1004 may also control and update display screens on UI 1002. CDM 1006 may control flows from a plurality of pumps and/or valves 1010 in beverage dispenser 504 according to a recipe to mix and dispense a product (e.g., a beverage) from beverage dispenser 504. For example, the CDM 1006 may control the flow of a beverage ingredient through the flow module 20.

Beverage ingredients (e.g., micro-ingredients, macro-ingredients, and/or diluents) may be combined to dispense various products that may include beverages or blended beverages (i.e., finished beverage products) from beverage dispenser 504. However, beverage dispenser 504 may also be configured to dispense beverage components individually.

An example of control architecture 1000 for beverage dispenser 504 may be described in U.S. Ser. No. 61/987,020, entitled "Dispenser Control Architecture", filed on May 1, 2014, the entirety of which is hereby incorporated by reference. MBUS 1005 may facilitate communication between HMI 1004 and CDM 1006 via one or more API calls. HMI 1004, MBUS 1005, and CDM 1006 may collectively comprise common core components, implemented as hardware or as combination of hardware and software, which may be adapted to provide customized functionality in beverage dispenser 504. Beverage dispenser 504 may further include memory storage and a processor. Examples of UI 1002 may be described in U.S. Ser. No. 61/877,549, entitled "Product Categorization User Interface for a Dispensing Device", filed on Sep. 13, 2013, the entirety of which is hereby incorporated by reference.

UI 1002 may detect what area of a touch screen has been touched by a user (e.g., user 108). In response, UI 1002 may send HMI 1004 data regarding where the touch screen was touched. In response, HMI 1004 may interpret this received data to determine whether to have UI 1002 display a different UI screen or to issue a command to CDM 1006. For example, HMI 1004 may determine that the user touched a portion of the touch screen corresponding to a beverage brand. In response, HMI 1004 may issue a command to CDM 1006 to pour the corresponding beverage brand. In response to receiving the command to pour the corresponding beverage brand, the CDM 1006 in turn issues commands via one or more control buses 1008 to the pumping or metering devices 1010 for the beverage ingredients needed to dispense the beverage brand. Or HMI 1004 may determine that the user touched a portion of the touch screen corresponding to a request for another screen. In response, HMI 1004 may cause UI 1002 to display the requested screen.

For example, the CDM 1006 issues commands via a control bus 1008 to the flow control module 20 in response to receiving a command to pour a selected beverage brand, as described above in conjunction with FIGS. 10-12. For example, the controller 106 may be implemented by the CDM 1006. Alternatively, the CDM 1006 may issue commands via the control bus to the controller 106 for controlling operation of the flow control module 20. Upon the HMI 1004 receiving a selection of a beverage brand, the CDM 1006 may obtain a recipe for the selected beverage from the recipe database 102. Upon the HMI 1004 receiving a command to pour the beverage (e.g., pour actuator 104 indicates an "on" status), the CDM 1006 sends a signal to a solenoid driver 108, which in turn sends a signal to the first solenoid assembly 28 such that first solenoid assembly 28 causes the flow control module 20 to flow (e.g., the on/off solenoid assembly 28 turns on and opens armature 46 so that the flow may proceed into passageway 54). Additionally, the CDM 1006 sends a signal to the solenoid driver indicating a voltage level to drive the second solenoid assembly 30 so that it releases a flow at the predetermined rate (e.g., armature 66 is acted upon by coil 58 such that it moves to allow the flow at the predetermined rate). CDM 1006 compares the predetermined flow rate with a signal from the flow meter 92, which detects the actual flow rate through the inlet orifice 24 and adjusts the voltage level to drive the second solenoid assembly 30 accordingly throughout the dispense of the beverage in accordance with the recipe.

In some embodiments, UI 1002 in beverage dispenser 504 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1002 may be addressed via a number of methods to select and dispense beverages. For example, a user may interact with UI 1002 via touch input to navigate one or more menus from which to select and dispense a beverage. As another example, a user may type in a code using an onscreen or physical keyboard (not shown) on beverage dispenser 504 to navigate one or more menus from which to select and dispense a beverage. As a further example, a user may interact with the HMI 1004 via a user interface of an application on the mobile device 552.

UI 1002, which may include a touch screen and a touch screen controller, may be configured to receive various commands from a user (i.e., consumer input) in the form of touch input, generate a graphics output and/or execute one or more operations with beverage dispenser 504 (e.g., via HMI 1004 and/or CDM 1006), in response to receiving the aforementioned commands. A touch screen driver in HMI 1004 may be configured to receive the consumer or customer inputs and generate events (e.g., touch screen events) that may then be communicated through a controller to an operating system of HMI 1004.

Beverage dispenser 504 may be in communication with one or more external device (e.g., mobile device 552 or POS 554). In some embodiments, the communication between beverage dispenser 504 and the external device may be accomplished utilizing any number of communication techniques including, but not limited to, near-field wireless technology such as BLUETOOTH, Wi-Fi and other wireless or wireline communication standards or technologies, via a communication interface.

Figure 16:
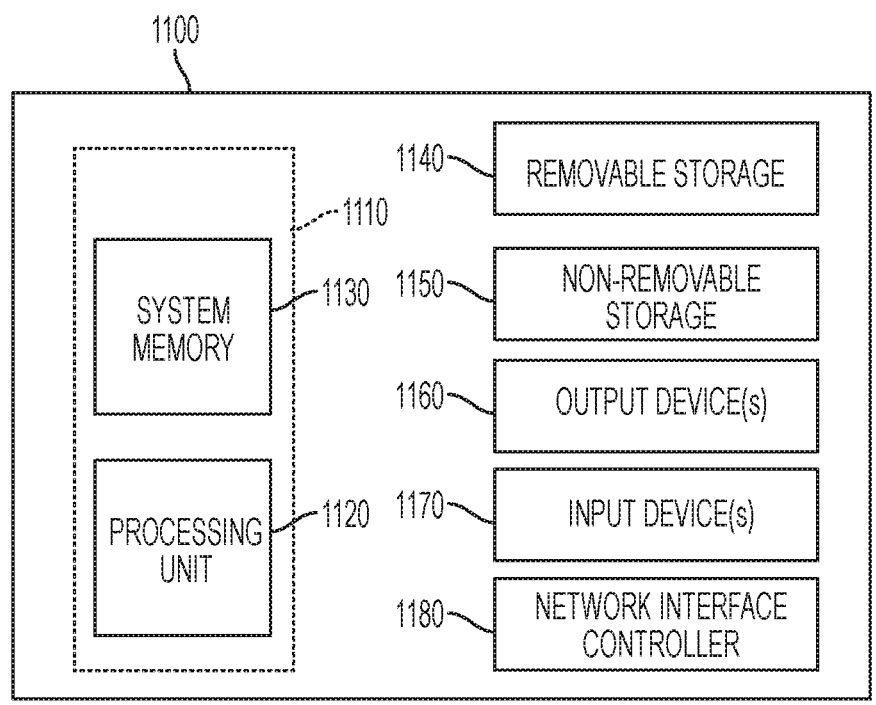
FIG. 16 is an exemplary computer system according to the teachings herein.

FIG. 16 illustrates an exemplary computer system 1100 suitable for implementing the several embodiments of the disclosure. For example, one or more components or controller components of the beverage dispenser 504 may be implemented as the computer system 1100. In some implementations, one or both of the HMI 1004 and the CDM 1006 may be implemented as the computer system 1100.

It should be appreciated that the logical operations described herein with respect to the various figures may be implemented (1) as a sequence of computer implemented acts or program modules (i.e., software) running on a computing device (e.g., the computing device described in FIG. 16), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 16, an example computing device 1100 upon which embodiments of the invention may be implemented is illustrated. For example, each of the content source, key server, segmentations servers, caching servers, and client devices described herein may each be implemented as a computing device, such as computing device 1100. It should be understood that the example computing device 1100 is only one example of a suitable computing environment upon which embodiments of the invention may be implemented. Optionally, the computing device 1100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 1100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 1100 to provide the functionality of a number of servers that is not directly bound to the number of computers in the computing device 1100. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 1100 typically includes at least one processing unit 1106 and system memory 1104. Depending on the exact configuration and type of computing device, system memory 1104 may be volatile (such as random access memory (RAM)), non-volatile (such as read-only memory (ROM), flash memory, etc.), or some combination of the two. This most basic configuration is illustrated in FIG. 16 by dashed line 1102. The processing unit 1106 may be a standard programmable processor that performs arithmetic and logic operations necessary for operation of the computing device 1100. While only one processing unit 1106 is shown, multiple processors may be present. Thus, while instructions may be discussed as executed by a processor, the instructions may be executed simultaneously, serially, or otherwise executed by one or multiple processors. The computing device 1100 may also include a bus or other communication mechanism for communicating information among various components of the computing device 1100.

Computing device 1100 may have additional features/functionality. For example, computing device 1100 may include additional storage such as removable storage 1108 and non-removable storage 1110 including, but not limited to, magnetic or optical disks or tapes. Computing device 1100 may also contain network connection(s) 1116 that allow the device to communicate with other devices such as over the communication pathways described herein. The network connection(s) 1116 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1100 may also have input device(s) 1114 such as a keyboard, keypads, switches, dials, mice, track balls, touch screens, voice recognizers, card readers, paper tape readers, or other well-known input devices. Output device(s) 1112 such as a printer, video monitors, liquid crystal displays (LCDs), touch screen displays, displays, speakers, etc. may also be included. The additional devices may be connected to the bus in order to facilitate communication of data among the components of the computing device 1100. All these devices are well known in the art and need not be discussed at length here.

The processing unit 1106 may be configured to execute program code encoded in tangible, computer-readable media. Tangible, computer-readable media refers to any media that is capable of providing data that causes the computing device 1100 (i.e., a machine) to operate in a particular fashion. Various computer-readable media may be utilized to provide instructions to the processing unit 1106 for execution. Example tangible, computer-readable media may include, but is not limited to, volatile media, non-volatile media, removable media, and non-removable media implemented in any method or technology for storage of information such as computer readable instructions, data structures, program modules or other data. System memory 1104, removable storage 1108, and non-removable storage 1110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1106 may execute program code stored in the system memory 1104. For example, the bus may carry data to the system memory 1104, from which the processing unit 1106 receives and executes instructions. The data received by the system memory 1104 may optionally be stored on the removable storage 1108 or the non-removable storage 1110 before or after execution by the processing unit 1106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow control module, comprising:
   a housing having an inlet and an outlet and a passageway extending between the inlet and the outlet, the passageway defining a flow path through the flow control module;
   a first solenoid assembly mounted to the housing, the first solenoid assembly configured as an on/off solenoid assembly such that the first solenoid assembly is operable to allow a flow of fluid along the flow path through the flow control module in an on position and prevent the flow of fluid along the flow path through the flow control module in an off position;
   second solenoid assembly mounted to the housing, the second solenoid assembly configured as a proportional solenoid assembly, the second solenoid assembly configured to proportionally control the flow of fluid along the flow path through the flow control module downstream from the first solenoid assembly relative to the flow path through the flow control module;

a flow body having a flow passage therethrough, the flow body situated in the housing along the flow path and interposed between the first solenoid assembly and the second solenoid assembly, wherein the first solenoid assembly includes a first armature, and wherein the second solenoid assembly includes a second armature and an outer sleeve surrounding the second armature, wherein the second armature includes an annular flow channel formed into an outer surface of the second armature.

2. The flow control module of claim 1, wherein the first armature including an axially facing seal member, the seal member arranged to sealingly engage a seal surface of the flow body.

3. The flow control module of claim 2, wherein the seal surface is defined by a ridge having a semi-circular cross section and extending axially away from a flange of the flow body.

4. The flow control module of claim 1, wherein the flow passage through the flow body has an inlet region and a transition region, wherein the transition region has a variable cross sectional area.

5. The flow control module of claim 4, wherein the transition region has a maximum diameter of 0.200 inches to 0.350 inches.

6. A flow control module, comprising:
a housing having an inlet and an outlet and a passageway extending between the inlet and the outlet, the passageway defining a flow path through the flow control module;
a first solenoid assembly mounted to the housing, the first solenoid assembly configured as an on/off solenoid assembly such that the first solenoid assembly is operable to allow a flow of fluid along the flow path through the flow control module in an on position and prevent the flow of fluid along the flow path through the flow control module in an off position;
second solenoid assembly mounted to the housing, the second solenoid assembly configured as a proportional solenoid assembly, the second solenoid assembly configured to proportionally control the flow of fluid along the flow path through the flow control module downstream from the first solenoid assembly relative to the flow path through the flow control module;
a flow body having a flow passage therethrough, the flow body situated in the housing along the flow path and interposed between the first solenoid assembly and the second solenoid assembly,
wherein the flow passage through the flow body has an inlet region and a transition region, wherein the transition region has a variable cross sectional area,
wherein the first solenoid assembly includes a first armature, and wherein the second solenoid assembly includes a second armature, wherein the second armature has an internal cavity which has an axially facing opening that faces the transition region of the flow body, wherein a maximum diameter of the internal cavity is equal to the maximum diameter of the transition region.

7. The flow control module of claim 1, wherein the flow body is removable relative to the housing.

8. The flow control module of claim 1, wherein the annular flow channel is selectively alignable with a plurality of ports formed through the outer sleeve.

9. A flow control module, comprising:
a housing having an inlet and an outlet and a passageway extending between the inlet and the outlet, the passageway defining a flow path through the flow control module;
a first solenoid assembly mounted to the housing, the first solenoid assembly having a first armature movable relative to the housing;
a second solenoid assembly mounted to the housing, the second solenoid assembly having a second armature movable relative to the housing;
a flow body situated in the housing along the flow path and interposed between the first armature and the second armature, the flow body defining a flow passage through the flow body; and
wherein the flow passage through the flow body includes an inlet region and a transition region, the transition region having a variable cross section,
wherein an annular flow channel is formed in an outer surface of the second armature, the annular flow channel selectively alignable with a plurality of ports formed in an outer sleeve of the second solenoid assembly.

10. The flow control module of claim 9, wherein the flow body is removable from the housing.

11. The flow control module of claim 9, wherein the transition region has a maximum diameter of 0.200 inches to 0.350 inches.

12. The flow control module of claim 9, wherein the first solenoid assembly is configured as an on/off solenoid assembly and the second solenoid assembly is configured as a proportional solenoid assembly, the second solenoid assembly situated downstream from the first solenoid assembly relative to the flow path through the housing.

13. A flow control module, comprising:
a housing having an inlet and an outlet and a passageway extending between the inlet and the outlet, the passageway defining a flow path through the flow control module;
a first solenoid assembly mounted to the housing, the first solenoid assembly having a first armature movable relative to the housing;
a flow body situated in the flow path and having a flow passage therethrough; and
a second solenoid assembly mounted to the housing, the second solenoid assembly having a second armature movable relative to the housing, wherein the second armature includes an internal cavity and a plurality of ports formed through an outer surface of the second armature in communication with the internal cavity, wherein the second armature includes an annular flow channel formed in the outer surface of the second armature, and wherein the second solenoid assembly includes an outer sleeve surrounding the second armature, wherein an annular flow space is defined between an outer surface of the sleeve and an interior surface of the housing, the annular flow ring movable relative to a plurality of ports formed through the sleeve.

14. The flow control module of claim 13, wherein the flow body is removable.

15. The flow control module of claim 13, wherein the flow passage through the flow body includes an inlet region and a transition region.

16. The flow control module of claim 15, wherein the transition region has a maximum diameter of 0.200 inches to 0.350 inches.

17. The flow control module of claim 13, wherein the first solenoid assembly is configured as an on/off solenoid assembly and the second solenoid assembly is configured as a proportional solenoid assembly, the second solenoid assembly situated downstream from the first solenoid assembly relative to the flow path through the housing.

18. The flow control module of claim 15, wherein the second armature has an internal cavity which has an axially facing opening that faces the transition region of the flow body, wherein a maximum diameter of the internal cavity is equal to the maximum diameter of the transition region.

\* \* \* \* \*